(12) United States Patent
Eyer et al.

(10) Patent No.: US 8,745,687 B2
(45) Date of Patent: Jun. 3, 2014

(54) DIGITAL CLOSED CAPTION TRANSPORT IN STANDALONE STREAM

(75) Inventors: Mark K. Eyer, Woodinville, WA (US);
Mandayam A. Narasimhan, San Diego, CA (US)

(73) Assignee: Sony Corporation, Tokyo (JP)

(*) Notice: Subject to any disclaimer, the term of this patent is extended or adjusted under 35 U.S.C. 154(b) by 1996 days.

(21) Appl. No.: 11/338,110

(22) Filed: Jan. 23, 2006

(65) Prior Publication Data

US 2006/0184994 A1 Aug. 17, 2006

Related U.S. Application Data

(60) Provisional application No. 60/652,996, filed on Feb. 15, 2005.

(51) Int. Cl.
*H04N 7/08* (2006.01)
*H04N 1/00* (2006.01)

(52) U.S. Cl.
CPC ....... *H04N 1/00114* (2013.01); *H04N 1/00122* (2013.01)
USPC ............................. 725/139; 725/136; 725/137

(58) Field of Classification Search
CPC ...................... H04N 1/00114; H04N 1/00122
USPC ........... 725/32, 37–40, 50, 54, 131, 135–137, 725/139, 151
See application file for complete search history.

(56) References Cited

U.S. PATENT DOCUMENTS

| | | | |
|---|---|---|---|
| 5,477,274 A | 12/1995 | Akiyoshi et al. | 348/468 |
| 5,572,260 A | 11/1996 | Onishi et al. | 348/460 |
| 5,913,009 A | 6/1999 | Kuboji et al. | 386/68 |
| 6,101,274 A * | 8/2000 | Pizano et al. | 382/176 |
| 6,243,419 B1 * | 6/2001 | Satou et al. | 375/240.13 |
| 6,829,249 B1 | 12/2004 | Ray et al. | 370/466 |
| 7,430,016 B2 * | 9/2008 | Park | 348/468 |
| 2002/0154220 A1 * | 10/2002 | Dieterich | 348/184 |
| 2005/0071881 A1 * | 3/2005 | Deshpande | 725/88 |
| 2006/0037041 A1 * | 2/2006 | Zhang | 725/32 |
| 2009/0244373 A1 * | 10/2009 | Park | 348/468 |

OTHER PUBLICATIONS

Randell, Brian, "Hardware/Software Tradeoffs: A General Design Principle?", Jan. 25, 1985, The Universityof Newcastle Upon Tyne Computing Laboratory, p. 2.*

Office of Engineering and Technology, Federal Communications Commission, "Closed Captioning Requirements for Digital Television Receivers" Feb. 2, 2006, 24 pages.

Graham James, "Implementing Closed Captioning for DTV", 2004, p. 1-8, National Association of Broadcasters Broadcast Engineering Conference Proceedings.

Philip J. Cianci, "Special Report: The many method of Closed Captioning", 2004, p. 1-4, Broadcast Engineering. <http://broadcastengineering.com/mag/broadcasting_special_report_methods/>.

(Continued)

*Primary Examiner* — Benjamin R Bruckart
*Assistant Examiner* — Jason Thomas
(74) *Attorney, Agent, or Firm* — Haverstock & Owens LLP

(57) ABSTRACT

A method and system for digital closed caption transport are provided. In one example, the method involves receiving closed caption data and a program feed having video content, embedding the closed caption data into a standard video syntax, and encoding the video content into the standard video syntax as a background, wherein the closed caption data and the video content are encoded into a closed caption program feed.

23 Claims, 8 Drawing Sheets

```
Syntax                                                    No. of Bits   Format
cc_data() {
    reserved                                              1             '1'
    process_cc_data_flag                                  1             bslbf
    additional_data_flag                                  1             bslbf
    cc_count                                              5             uimsbf
    reserved                                              8             '1111 1111'
    for (i=0 ; i < cc_count; i++) {
        marker_bits                                       5             '1111 1'
        cc_valid                                          1             bslbf
        cc_type                                           2             bslbf
        cc_data_1                                         8             bslbf
        cc_data_2                                         8             bslbf
    }
    marker_bits                                           8             '1111 1111'
    if (additional_data_flag) {
        while (nextbits() != '0000 0000 0000 0000 0000 0001') {
            additional_cc_data
        }
    }
}
```

(56) References Cited

OTHER PUBLICATIONS

Advanced Television Systems Committee "ATSC Digital Television Standard (A/53), Revision E", Including Amendment No. 1 and Corrigendum No. 1, 2004, p. 1-101.

Alan Stewart, "2-3 Pulldown Explained", 2005, p. 1-5, <http://www.zerocut.com/tech/pulldown.html>.

Dan Ramer, "What the Heck is 3:2 Pulldown?", 2005, p. 1-5, <http://www.dvdfile.com/news/special_report/production_a_z/3_2_pulldown.html>.

Louis D. Fielder et al. "Introduction to Dolby Digital Plus, an Enhancement to the Dolby Digital Coding System", 2004, p. 1-29, Convention Paper 6196 of the 117$^{th}$ Convention, Audio Engineering Society.

* cited by examiner

| Syntax | No. of Bits | Format |
|---|---|---|
| user_data() { <br>   user_data_start_code <br>   ATSC_identifier <br>   user_data_type_code <br>   if (user_data_type_code =='0x03') <br>     cc_data() <br>   else if (user_data_type_code == '0x06') <br>     bar_data() <br>   else { <br>     while (nextbits() != '0000 0000 0000 0000 0000 0001') { <br>       ATSC_reserved_user_data <br>     } <br>   } <br>   next_start_code() <br> } | 32 <br> 32 <br> 8 <br><br><br><br><br><br><br> 8 | bslbs <br> bslbs <br> uimsbf <br><br><br><br><br><br><br> |

Fig. 6

| Syntax | No. of Bits | Format |
|---|---|---|
| cc_data() { | | |
|   reserved | 1 | '1' |
|   process_cc_data_flag | 1 | bslbf |
|   additional_data_flag | 1 | bslbf |
|   cc_count | 5 | uimsbf |
|   reserved | 8 | '1111 1111' |
|   for (i=0 ; i < cc_count; i++) { | | |
|     marker_bits | 5 | '1111 1' |
|     cc_valid | 1 | bslbf |
|     cc_type | 2 | bslbf |
|     cc_data_1 | 8 | bslbf |
|     cc_data_2 | 8 | bslbf |
|   } | | |
|   marker_bits | 8 | '1111 1111' |
|   if (additional_data_flag) { | | |
|     while (nextbits() != '0000 0000 0000 0000 0000 0001') { | | |
|       additional_cc_data | | |
|     } | | |
|   } | | |
| } | | |

DIGITAL CLOSED CAPTION TRANSPORT IN STANDALONE STREAM

RELATED APPLICATION

This application claims priority under 35 U.S.C. §119(e) of the co-pending U.S. provisional patent application Ser. No. 60/652,996, filed on Feb. 15, 2005, and titled "DIGITAL CLOSED CAPTION TRANSPORT IN A STANDALONE STREAM." The provisional patent application Ser. No. 60/652,996, filed on Feb. 15, 2005 and titled "DIGITAL CLOSED CAPTION TRANSPORT IN A STANDALONE STREAM," is hereby incorporated by reference.

FIELD OF THE INVENTION

The present invention relates to closed captioning. More particularly, the present invention relates to closed captioning transport for digital television broadcasts that may include music services and caption-only programming in addition to conventional audio/video programming.

BACKGROUND OF THE INVENTION

As the broadcast industry transitions to digital services, the complexity created by multiformat programming means that broadcasters need to look carefully at how they will handle closed captions (CC). What was once the relatively simple act of inserting CC data into line 21 of a National Television System Committee (NTSC) signal has now, as has every other aspect of DTV infrastructure, expanded exponentially in complexity.

FIG. 1 illustrates a digital television (DTV) screen shot 101 including closed caption text 102. Since Jul. 1, 2002, the Federal Commerce Commission (FCC) has required U.S. broadcasters to provide closed captioning on at least some of their programs transmitted on DTV channels. No distinction is made in the FCC rules between Digital Television Closed Captioning (DTVCC) for high definition or for standard definition programming; requirements are the same for both.

According to rules of the Federal Commerce Commission (FCC), all DTV set-top boxes are now to include a caption decoder complying with CEA-708-B of the Consumer Electronics Association. Decoders must be able to decode the six standard services in CEA-708-B and allow users to choose at least one for display. Set-top boxes that have an analog NTSC output are expected to insert CEA-608-B caption data carried in the DTV signal into line 21 of the NTSC video output in order to comply with FCC rules.

FIG. 2 illustrates how closed captioning is carried in the video user bits of the MPEG-2 bitstream. The CEA-608-B standard defines the coding of data, including captioning. Captions generated in accordance with CEA-608-B are commonly referred to as "608" captions. The 608 standard allows for up to four caption services per program and provides the familiar limited range of white characters (color is allowed but rarely used) within a box-like black background field.

The CEA-708-B ("708") standard defines the coding of DTVCC as they are delivered in an Advanced Television Systems Committee (ATSC) emission bitstream as specified by ATSC. This standard is applicable equally to high definition and standard definition video formats and to both satellite broadcasting and cable distribution.

DTVCC captions have greatly enhanced formatting and display capabilities compared to 608 captions, with up to 63 services per program (only 16 can be announced in Program and System Information Protocol (PSIP)), eight independently controlled display windows, and an extended range of characters and multiple fonts, sizes and background and character colors and edges. The 708 standard specifies how caption information is to be coded and processed, minimum implementation recommendations for Digital Television (DTV) closed caption decoders, and recommended practices for caption encoder and decoder manufacturers. The 708 standard also requires that decoders give users control over caption font, color, size and location that may override the parameters as transmitted.

In addition to the actual 708 caption data required for use by a DTV set-top box or integrated receiver to display DTV captions, the 708 standard allows for carriage of equivalent data for a subset of the captions coded in the 608 format for NTSC-based receivers. This legacy 608 data, also known as the "608 compatibility bytes," is required for use by DTV set-top boxes so that line 21 data can be inserted in an analog composite video output (if provided) to feed a legacy NTSC TV set. Some DTV receivers may use the 608 data when 708 data is not available for providing closed captioning on the DTV display, but this is not mandatory and is not implemented in some receivers.

The 708 standard defines the Caption Distribution Packet (CDP) consisting of a specific sequence of bytes that can hold the actual 708 DTV caption data, the 608 caption data, caption service information, and optional time code for synchronization (not needed with transport methods where the CDP is directly associated with video frames). The CDP is the basic unit of data that is transported through the professional portion of a DTV caption distribution chain.

Caption service information comprises the caption service descriptor (CSD) as defined in the ATSC PSIP standard. It is used in the ATSC transport stream EIT (event information table) and PMT (program map table) to announce the presence and format of captions being carried.

It is possible for captions to be encoded in the 708 DTVCC format by conversion from 608 legacy captions already encoded in line 21 of an analog NTSC video feed. This method is used when the program was created primarily for NTSC transmission but is being encoded for DTV transmission, either as a standard definition (SD) program or with up-conversion to a high definition (HD) program. For new programming this is expected to be an interim solution until native 708 caption authoring is generally adopted, but may persist indefinitely for legacy material that is already captioned.

SUMMARY OF THE INVENTION

What is needed is a method of carrying captioning in situations where MPEG-2 video is not present throughout every frame of a program, and in cases involving video codecs other than MPEG-2 video. The method defines caption data on a frame-by-frame basis and specifies temporal alignment with any video frames that may be present in the program. Over time, MPEG-2 video will likely be phased out in favor of more efficient codecs. Broadly speaking, the present invention fills these needs by providing a method of closed captioning utilizing current conventional syntax, as opposed to embedding the closed captioning data structure in each of the new video stream types. It should be appreciated that the present invention can be implemented in numerous ways, including as a method, a process, an apparatus, a system or a device. Inventive embodiments of the present invention are summarized below.

In one embodiment, a method of closed caption transport is provided. The method comprises receiving closed caption data and a program feed, embedding the closed caption data into a standard video syntax, and encoding video content into the standard video syntax as a background, wherein the closed caption data and the video content are encoded into a closed caption program feed.

In another embodiment, an encoder for closed caption transport is provided, the encoder comprises a receiving device configured to receive closed caption data and a program feed, an embedding device configured to embed the closed caption data into a standard video syntax, and an encoding device configured to encode video content into the standard video syntax as a background, wherein the closed caption data and the video content are encoded into a closed caption program feed.

In yet another embodiment, a computer-readable medium is provided carrying one or more instructions for a method of closed caption transport, wherein the one or more instructions, when executed by one or more processors, cause the one or more processors to perform receiving closed caption data and a program feed, embedding the closed caption data into a standard video syntax, and encoding video content into the standard video syntax as a background, wherein the closed caption data and the video content are encoded into a closed caption program feed.

The invention encompasses other embodiments are configured as set forth above and with other features and alternatives.

BRIEF DESCRIPTION OF THE DRAWINGS

The present invention will be readily understood by the following detailed description in conjunction with the accompanying drawings. To facilitate this description, like reference numerals designate like structural elements.

FIG. 6 illustrates the picture user data syntax, in accordance with the present invention;

FIG. 7 illustrates the syntax for captioning data, in accordance with the present invention.

DETAILED DESCRIPTION OF THE PREFERRED EMBODIMENT

An apparatus for and method of including a digital closed caption transport in a standalone stream is disclosed. Numerous specific details are set forth in order to provide a thorough understanding of the present invention. It will be understood, however, by one skilled in the art, that the present invention may be practiced with other specific details.
Overview of Closed Caption Transport Scheme The method relates to a method of carrying closed captioning and caption-related information in a program element separate from video. The closed captioning is consistent with Consumer Electronics Association (CEA) standards CEA-608-B ("608"), CEA-708-B ("708"), Society of Cable Telecommunications Engineers (SCTE) standard SCTE 20 and other standards. The method of the present invention is capable of carrying such information as North American Basic Teletext Specification (NABTS), Luma/PAM (Pulse Amplitude Modulation), Vertical Internal Time Code (VITC), extended data services (XDS), world Teletext, as well as conventional closed captioning text.

In the current ATSC Digital Television Standard, caption data is carried within the MPEG-2 video syntax, in picture-level "user data." The present invention provides a method for carrying captioning in situations where MPEG-2 video is not present, such as in "audio fallback" modes of Enhanced Vestigial Side Band (E-VSB), and in cases where video codecs other than MPEG-2 video are being used. Over time, MPEG-2 is likely to be phased out in favor of more efficient codecs, such as H.264 (MPEG-4 Part 10, AVC) or Microsoft® VC-1. H.264 stands for High Compression Digital Video Standard 264. AVC stands for Advanced Video Coding. For the current and next generation video streams, the present invention provides a method of closed captioning transport while keeping the current video syntax.

Standalone caption streams are embedded within the MPEG-2 video syntax as they currently are. However, the encoded video content is gray or black, resulting in extremely low overhead to carry video information. Advantageously, the parsing logic in existing caption decoders can operate without substantial change and the inherent timing signals present in the video syntax remain usable. This invention is applicable to a U.S. digital television standard on closed caption carriage in digital multiplexes. Thus, this invention is ubiquitously applicable to current and next generation video streams.

Figure 1:
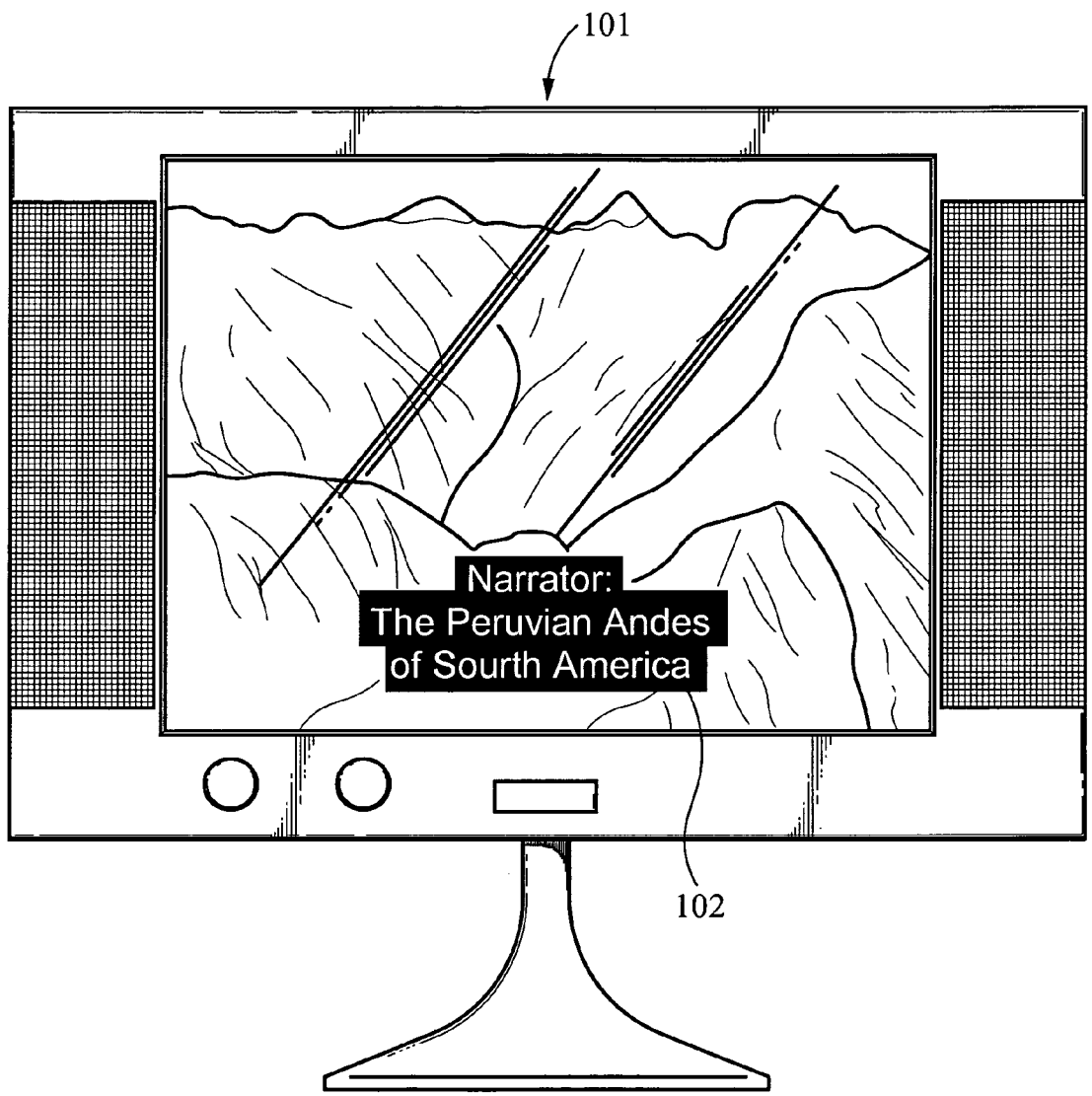
FIG. 1 illustrates a digital television (DTV) screen shot 101 including closed caption text 102.
Figure 2:
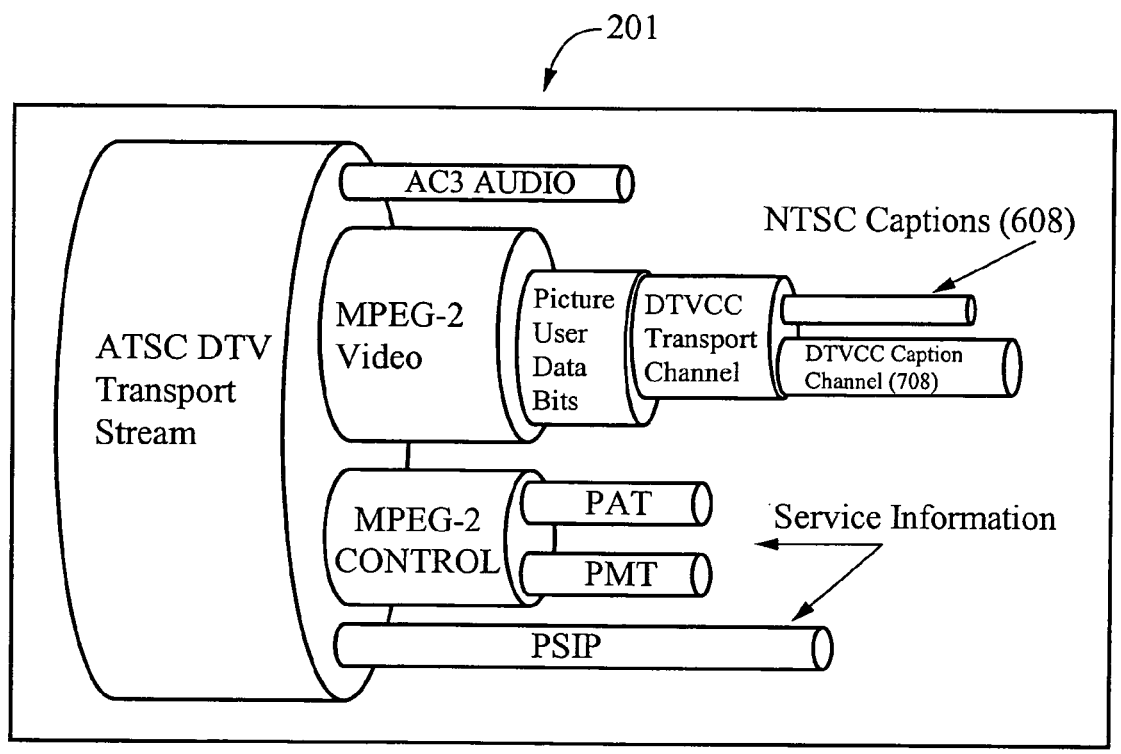
FIG. 2 illustrates a diagram illustrating how closed captioning is carried in the video user bits of the MPEG-2 bitstream.
Figure 3:
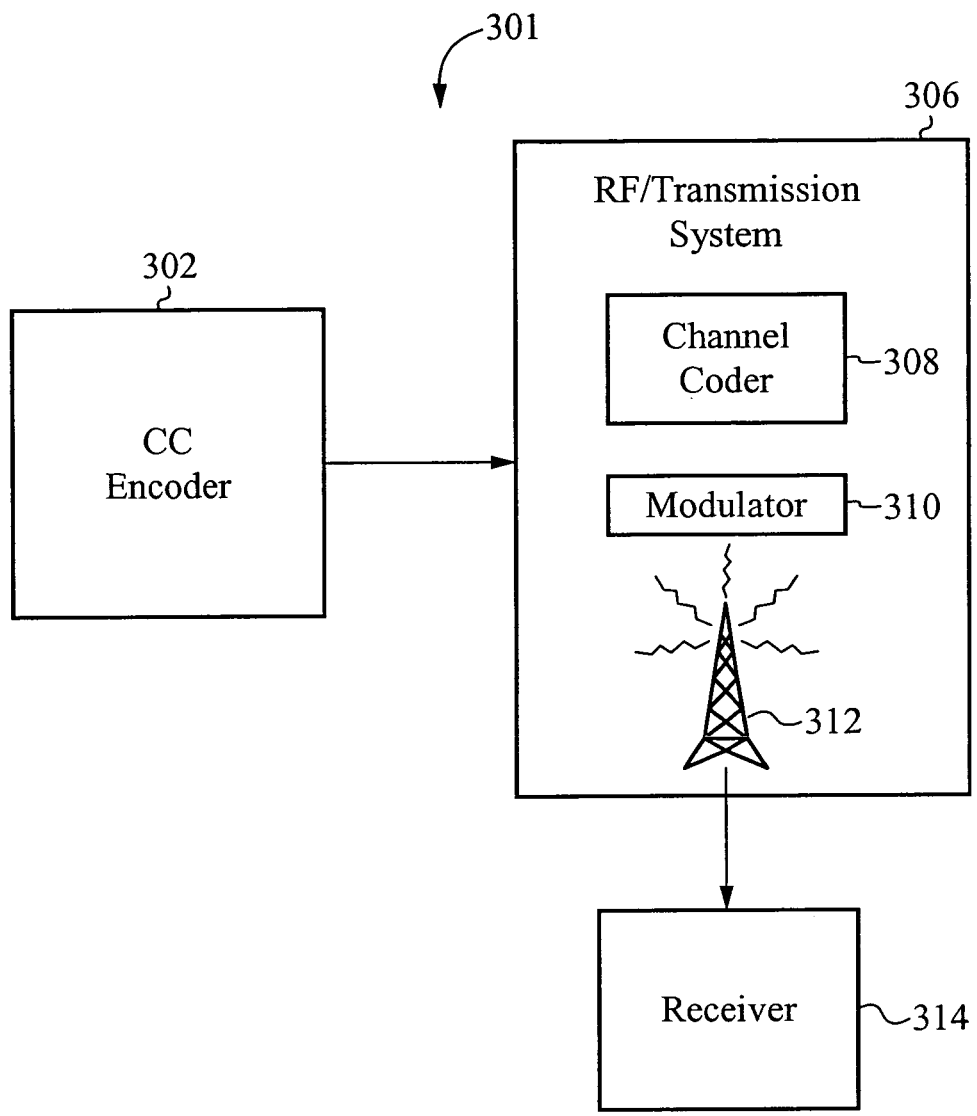
FIG. 3 illustrates a basic diagram of a digital television (DTV) system 301, in accordance with the present invention.

FIG. 3 illustrates a basic diagram of a digital television (DTV) system 301, in accordance with the present invention. The DTV system 301 is consistent with the DTV system of the ATSC DTV Standard (A/53). The RF/transmission system 306 and the CC encoder 302 are useful for satellite applications, cable applications and other digital applications.

The CC encoder 302 involves source coding and compression, which includes data compression appropriate for application to video, audio and ancillary digital data streams. Ancillary data includes control data, conditional access control data, and data associated with the program audio and video services, such as closed captioning. One purpose of the encoder is to minimize the number of bits needed to represent the audio and video information. In one embodiment, the DTV 301 employs the MPEG-2 video stream syntax for the coding of video and the Digital Audio Compression (AC-3) Standard for the coding of audio. In other embodiments, the DTV 301 employs another video stream syntax, such as MPEG-4. The present invention is not limited to a particular video stream syntax.

The CC encoder 302 may include a device (not shown) for dividing the digital data stream into packets of information, a device for uniquely identifying each packet of packet type and a device for multiplexing video data stream packets, audio data stream packets and ancillary data stream packets into a single data stream.

The RF/Transmission System 306 includes a channel coder 308 and a modulator 310. The channel coder 308 is configured to take the data bit stream and add additional information that can be used by the receiver 314 to reconstruct the data from the received signal which, due to transmission impairments, may not accurately represent the transmitted signal. The modulator 310 is configured to use the digital data stream information to modulate the signal to be transmitted.

Figure 4:
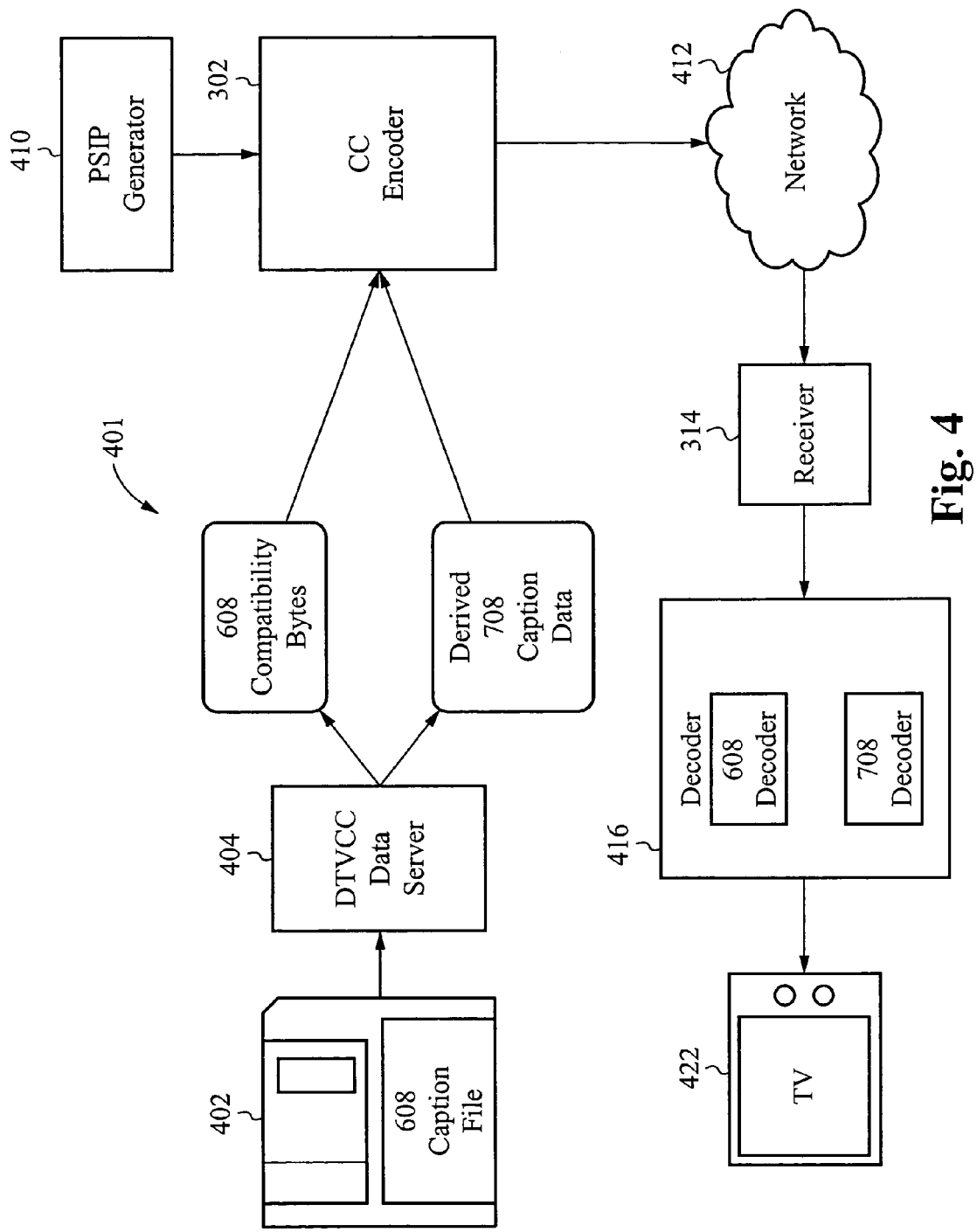
FIG. 4 illustrates a block diagram illustrating other components of a digital television (DTV) system, in accordance with the present invention.

FIG. 4 illustrates a block diagram illustrating other components of a digital television system (DTV) 401, in accordance with the present invention. A Digital Television Closed Captioning (DTVCC) data server 404 is configured to receive a 608 caption file 402. The DTV signals for broadcast and cable distribution, both for HD and SD program material with closed captions, need to carry 708 DTV caption data and 608 compatibility bytes. The DTV signals also carry caption service descriptors (not shown) in the EIT and PMT to announce the presence and format of captions being carried. The CC encoder 302 can then generate signals that comport with ATSC requirements.

The CC encoder 302 receives data from the DTVCC data server 404, processes the data with information received from the PSIP generator 410 and inserts the processed data into line 21 of the stream that complies with CEA-608-B for NTSC transmission. It is generally straightforward to insert, extract or re-encode line 21 captions at any point where the video program is available as an NTSC signal. Where 708 captions need to be carried in a video signal, the architecture for coding is similar to the 608 arrangement. For native 708 captioning, the data from the DTVCC data server 404 is processed and inserted as caption distribution packets (CDP) embedded in Vertical Ancillary (VANC) packets in the video signal. Alternatively, 608 captions from an NTSC video feed may be used as a source of captions to be translated to 708. In such a situation, the two video sources must have identical program content.

The receiver 314 receives a modulated signal from a transmission system 306, which is part of the network 412. A decoder 416 decodes the encoded transmission into signal that is suitable for display on a television 422. The decoder 416 includes a 608 decoder and a 708 decoder.

Note that 608 and 708 are current standards to which closed captioning must comply. The present invention is not limited to transporting data conforming to current standards and can be implemented to carry current standards as well as next generation standards.

Figure 8:
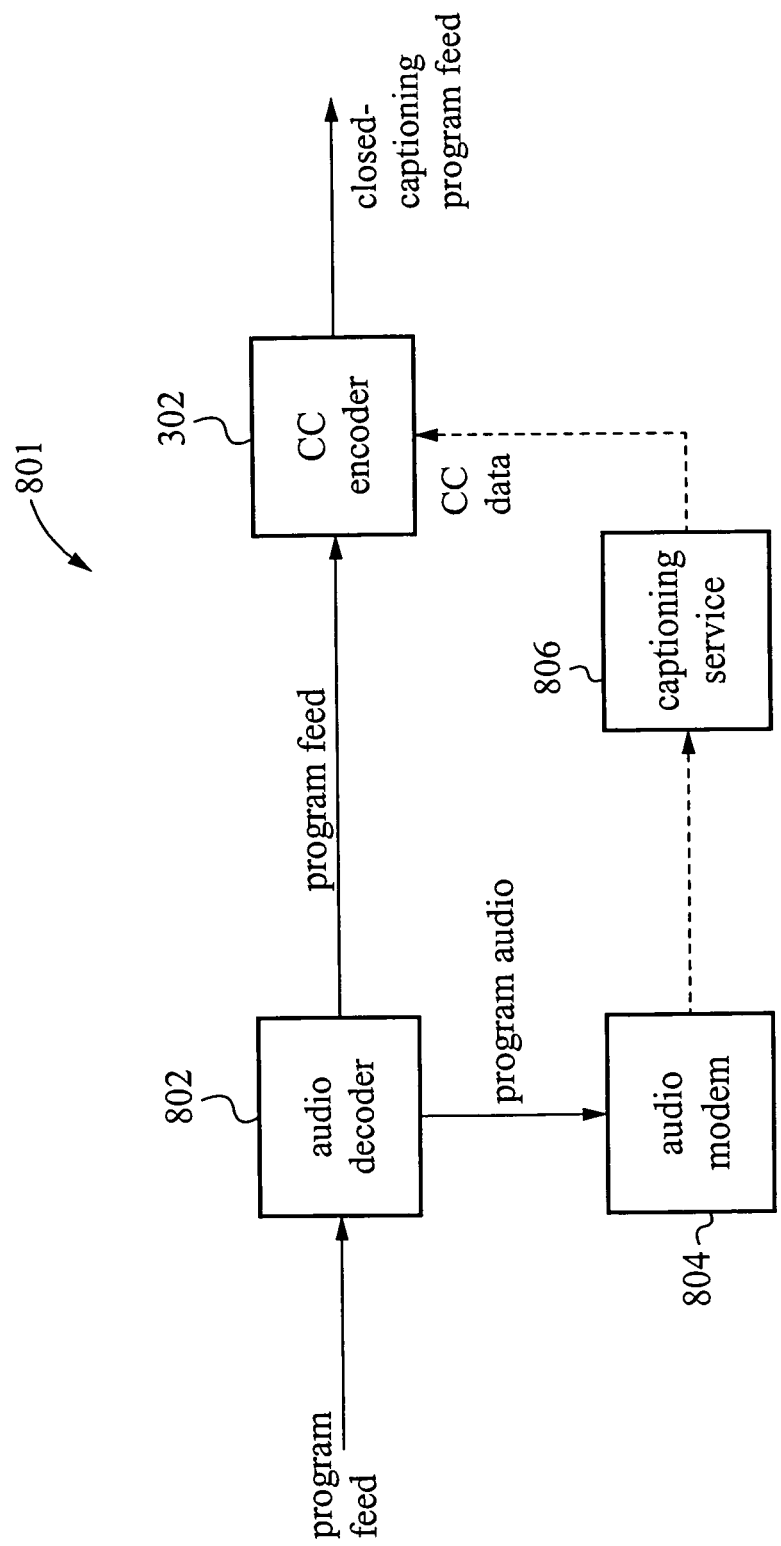
FIG. 8 illustrates a block diagram illustrating the online signal flow of a captioning service provider, in accordance with the present invention.

FIG. 8 illustrates a block diagram illustrating the online signal flow 801 of a captioning service provider, in accordance with the present invention. In a live television show, an audio decoder 802 receives a program feed of the television show. The audio decoder 802 decodes the program audio from the program feed and uses an audio modem 804 to send the program audio to a closed captioning service 806. In one embodiment, the audio modem 804 utilizes a telephone line to send the program audio to the captioning service 806. The closed captioning service 806 returns the closed captioning text stream (or CC data) to the CC encoder 302. In one embodiment, the closed captioning service 806 uses a modem to send the CC data over a telephone line to the CC encoder 302. The CC encoder 302 then sends the closed captioning program feed to the transmission system 306 for further coding, modulation and transmission.

The CC encoder 302 includes a receiving device (not shown) configured to receive closed caption data and to receive a program feed. The CC encoder 302 includes an embedding device (not shown) configured to embed the closed caption data into a standard video syntax. The CC encoder 302 includes an encoding device (not shown) configured to encode the video content into the standard video syntax as background. The closed caption data and the video content are encoded as part of the closed caption program feed. The CC encoder 302 is hardware, software or a combination thereof.

Captions in "Normal" Video Programming

"Normal video" is programming that has a video frame encoded for each display frame. When normal video programming is present, captions should be carried in the video elementary stream analogous to the technique currently defined in ATSC Digital Television Standard A/53 for MPEG-2. In that standard, user data is provided for each frame of video.

Figure 5:
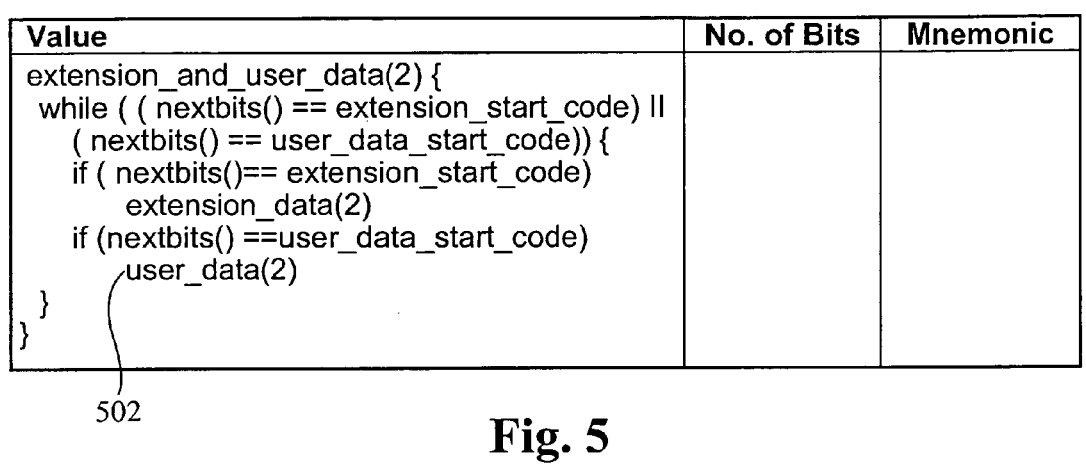
FIG. 5 illustrates the syntax for picture extension and user data, in accordance with the present invention.

FIG. 5 illustrates the syntax 501 for picture extension and user data, in accordance with the present invention. This syntax 501 complies with ATSC standards. The extension and user data are inserted at the sequence, group of pictures (GOP), and picture level. This syntax 501 includes usage of the data structure user_data( ) 502.

FIG. 6 illustrates the picture user data syntax 601, in accordance with the present invention. This syntax 601 complies with ATSC standards. The data structure cc_data( ) 602 defines the closed captioning data.

FIG. 7 illustrates the syntax 701 for captioning data, in accordance with the present invention. This syntax 701 complies with ATSC standards. The syntax is the data structure cc_data( ) 602. The method of the present invention does not alter this data structure CC data while encoding CC data into the program feed. FIG. 8 illustrates where the CC encoder 302 inserts CC data into the program feed.

Captions in "Non-Normal" Video Programming

When video is present, but it lacks the 1:1 mapping of encoded frames to display frames, this is "non-normal" video. The main examples of this are MPEG-2 low_delay mode and still frame mode.

Captions, to be fully functional, require the ability to output a caption packet with every frame. This is needed to define the 608 compatibility output for each frame and to preserve the 708 bandwidth and (implied) buffering model.

For still frame mode, as of the date of this writing, no standardized scheme preserves all the properties and bandwidth of captions. Captions could still be output on the infrequent video I frames. However, such a scheme may have limited application, especially if the time between I frames is long. Such a scheme would preclude any practical use of 608 compatibility, but it may be adequate for infrequently changing data such as song titles.

For low_delay mode where the full functionality of captioning is desired, it is possible to pre-pad zero-delta pictures before any large picture that causes decoder buffer underflow. This results in restoring the 1:1 mapping of encoded frames to display frames, and thus the video elementary stream is no longer in low_delay mode. If this technique is not acceptable, then the limitations of still frame mode described above apply.

Captions in Audio Only Programming

For existing systems, as well as E-VSB applications, when there is no video elementary stream, captions can be carried in a "minimal" video encoding conforming to A/53, Annex A. This preserves the video format signaling and is friendly to existing caption encoder and decoder architectures, yet still provides a reasonably small bandwidth stream desirable in E-VSB applications and other low-bandwidth applications.

This embodiment, using MPEG-2 video as the example, involves sending a legal MPEG-2 video elementary stream, but "hand encoding" it to be a series of black frames at some minimal permitted video format. Today, this embodiment is constrained by A/53 to SD@24 fps. However, any legal MPEG-2 video format can technically be used. For example, if Common Intermediate Format (CIF) @ 24 frames per second (fps) were to be usable, that would provide an additional bandwidth savings. Such a minimally encoded Packetized Elementary Stream (PES) packet may fit into a single transport packet.

The application of this technique is alternatively accomplished with other video codecs besides MPEG-2, such as MPEG-4.

Details of Closed Caption Transport

The following discussion provides closed captioning details using an example of a "Gray" picture scheme for MPEG-2. The example is provided for explanatory purposes. The present invention is not limited to this explanation. MPEG-2 may be replaced by a different video stream format, such as MPEG-4 for example.

The MPEG-2 "Gray" picture scheme supports captioning for audio only, no audio and video, still picture and low_delay mode applications. For audio only applications, the MPEG-2 program for this service can include an MPEG-2 video component in addition to the audio. The video component is only present for the purposes of conveying caption data. For applications with no audio or video, the MPEG-2 program for this service should include an MPEG-2 video component and any other program component.

MPEG-2 Gray video may be coded as (IPPPPP . . . ) or as (PPPPPP . . . ) without any B-pictures so that there is no re-ordering of captions between transmitted pictures and displayed pictures. "I" indicates the intra-coded frame. "P" indicates the predictive coded frame based on forward prediction. "B" indicates Bi-directional frames. I frames are typically located in front of the group of pictures. I frames are pictures that are used as reference points in the group of pictures (GOP). P frames are encoded from the past frames (or pictures) recording only the differences between the current frame and the reference frame. I frames are the largest in size and thus produce the highest bit rate. In addition, each picture is coded as "sequence-header, sequence-extension, picture-header, picture-user-data with captions" so that random access is made possible at each picture.

For a picture size of 176×128 for H.264 (AVC) video, each P-picture requires (12 bytes for sequence-header+10 bytes for sequence-extension+81 bytes for picture data+12 bytes for caption data)=115 bytes. 5 such pictures per PES packet fits into the payload of 3 transport packets (3×188 bytes) and one can send the compressed video data for 30 pictures/second using 18 transport packets or 27 Kbps. Video data for 24 pictures/second rate requires 22 Kbps.

MPEG-2 specifies use of a reference picture with Y=Cr=Cb=128 when decoding starts at a P picture with no reference. For audio only and no audio and video applications, this proposal recommends the MPEG-2 video to be coded as a continuous sequence of P-frames (PPPPPP . . . ). This does not require an I picture and the background for captions would appear as gray, if for any reason the encoded video were to be decoded and displayed.

If a background other than gray is desired, then the video may be coded as (IPPPPP . . . IPPPPP . . . IPPPPP) where the I-pictures carry the desired background and this will stay (as the P pictures repeat the I picture) until the next I picture with a different background is received. I pictures need to be repeated at regular intervals to assist in producing the desired background.

Note that acquisition is made at each picture (as each picture is coded with a sequence-header). If acquisition is made at a P picture the background will stay gray until an I picture is received. This coding scheme requires a slightly higher than 22 to 27 Kbps (Kilo bits per second) rate as the I pictures with the desired background require more than 115 bytes. However, this coding scheme provides the ability for broadcasters to customize a desired background when no other video program element is available.

This coding scheme can also be used for still video where the I pictures represent the "still video frames" with enough P pictures sent between the 2 still video I frames to keep the frame rate substantially constant. Such P pictures can also be used to fill the missing pictures between coded pictures and to keep the frame rate substantially constant in low_delay mode applications.

This scheme enables re-use of most of end to end caption systems deployed currently in encoders (from feeding captions at an encode station) and decoders (reconstruction of captions into NTSC and DTV signals). This also gives the flexibility to transmit the caption data at all the frame rates allowed by the A/53 standard and in display order as no B pictures are used.

These details, which apply to AVC video, assume Quarter Common Intermediate Format (QCIF) video format in MPEG-2 video (176×128) with multiple pictures carried in a PES packet. Note that the current ATSC standard specifies a lowest resolution of 704×480 for MPEG-2 video with one picture per PES packet.

Advantages of the Present Invention

The present invention is a closed captioning method in which standalone caption streams are embedded within standard video syntax, such as MPEG-2. However, the encoded video content is gray or black, resulting in extremely low overhead to carry video information.

A different closed caption transport scheme involving a new transport syntax and method would require changes to existing decoder/parser logic and circuitry. The present invention maintains the existing video syntax and transport, thus no changes to existing caption decoder designs are necessary.

A challenge of implementing a standalone caption stream is the difficulty of time-synchronizing the captions with video because certain video sequences involve out-of-order delivery of encoded delivery of encoded frames. This invention solves that problem by retaining the frame timing already implemented for standard video syntax, such as MPEG-2.

A standalone video stream should be efficient by not wasting bits. This invention wastes few bits even though legal standard video, such as MPEG-2, is encoded. An encoder can code all-black video frames very efficiently. The all-black (or all-gray) video sequence can be hand-encoded ("hard-coded") for maximum efficiency, for this application. A decoder does not actually decode this all-black video. The video stream itself is only present as a means to transport captioning and to establish proper timing for their display.

Within the E-VSB "fallback audio" application, the video encoder can, in real time, substitute all-black pictures for the original coded frames. Such substitution reduces the bit rate of the stream substantially while retaining captions. This procedure is very straightforward compared to other possible approaches.

New codecs are added to standards regularly. It would be inefficient and disruptive to have to revisit caption data transport every time a new stream is defined. The standalone approach of the present invention allows one solution to work into the future. This standalone approach will continue to provide the same level of audio frame and picture level synchronization for any new audio or video codec.

Practical Implementation of the Closed Caption System

Portions of the closed captioning system may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical disks, DVD, CD-ROMS, micro-drive, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including but not limited to receiving closed caption data and a program feed having video content, embedding the closed caption data into a standard video syntax, and encoding the video content into the standard video syntax as a background, according to processes of the present invention.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of closed caption transport, the method comprising:
   receiving closed caption data and a program feed having video content;
   embedding the closed caption data into a standard video syntax; and
   encoding the video content into the standard video syntax as a background, wherein the closed caption data and the video content are encoded into a closed caption program feed, wherein I-pictures carry desired background information, wherein if the background for captions is configured to appear as gray, then the video content is encoded as (PPPPPP . . . ), and if the background is a color other than gray, the video content is encoded as (IPPPPP . . . IPPPPP . . . IPPPPP).

2. The method of claim 1, wherein the background is gray.

3. The method of claim 1, wherein the method complies with a United States digital television standard on closed caption carriage in digital multiplexes, wherein the method is ubiquitously applicable to current and future generation video streams.

4. The method of claim 3, wherein the United States digital television standard is at least one of:
   CEA-608-B;
   CEA-708-B; and
   SCTE 20.

5. The method of claim 1, wherein the standard video syntax complies with a standard codec including at least one of:
   MPEG-2;
   MPEG-4;
   H.264; and
   Microsoft® VC-1.

6. The method of claim 1, wherein the program feed is at least one of:
   audio only;
   no audio and video;
   still picture; and
   low_delay mode.

7. The method of claim 1, wherein the closed caption program feed is a group of pictures, wherein each picture of the group of pictures is encoded as "sequence-header, sequence-extension, picture-header, picture-user-data with captions", wherein random access is possible at each picture.

8. The method of claim 7, wherein the encoding of the video content does not include encoding of B-pictures.

9. The method of claim 1, wherein the closed caption program feed is configured to be acquired at each picture, wherein if acquisition of a picture is made at a P picture the background is configured to be gray until an I picture is received.

10. The method of claim 1, wherein the program feed includes still video, wherein the I-pictures represent still video frames, wherein between consecutive I pictures is a sufficient number P pictures such that a frame rate of the closed caption program feed remains substantially constant.

11. The method of claim 1, wherein the program feed includes still video, wherein the I-pictures represent still video frames, wherein between consecutive I pictures are P pictures to fill missing pictures between coded pictures and to keep a frame of the closed caption program feed substantially constant.

12. An encoder for closed caption transport, the encoder comprising:
   a receiving device configured to receive closed caption data and a program feed having video content;
   an embedding device configured to embed the closed caption data into a standard video syntax; and
   an encoding device configured to encode the video content into the standard video syntax as a background, wherein the closed caption data and the video content are encoded into a closed caption program feed, wherein if the background for captions is configured to appear as gray, then the video content is encoded as (PPPPPP . . . ), and if the background is a color other than gray, the video content is encoded as (IPPPPP . . . IPPPPP . . . IPPPPP), and further wherein I-pictures carry desired background information.

13. The encoder of claim 12, wherein the background is gray.

14. The encoder of claim 12, wherein the encoder complies with a United States digital television standard on closed caption carriage in digital multiplexes, wherein the encoder is ubiquitously applicable to current and future generation video streams.

15. The encoder of claim 14, wherein the United States digital television standard is at least one of:
   CEA-608-B;
   CEA-708-B; and
   SCTE 20.

16. The encoder of claim 12, wherein the standard video syntax complies with a standard codec including at least one of:
   MPEG-2;
   MPEG-4;
   H.264; and
   Microsoft® VC-1.

17. The encoder of claim 12, wherein the program feed is at least one of:
   audio only;
   no audio and video;
   still picture; and
   low_delay mode.

18. The encoder of claim 12, wherein the closed caption program feed is a group of pictures, wherein each picture of the group of pictures is encoded as "sequence-header, sequence-extension, picture-header, picture-user-data with captions", wherein random access is possible at each picture.

19. The encoder of claim 18, wherein the encoding of the video content does not include encoding of B-pictures.

20. The encoder of claim 12, wherein the closed caption program feed is configured to be acquired at each picture, wherein if acquisition of a picture is made at a P picture the background is configured to be gray until an I picture is received.

21. The encoder of claim 12, wherein the program feed includes still video, wherein the I-pictures represent still video frames, wherein between consecutive I pictures is a sufficient number P pictures such that a frame rate of the closed caption program feed remains substantially constant.

22. The encoder of claim 12, wherein the program feed includes still video, wherein the I-pictures represent still video frames, wherein between consecutive I pictures are P pictures to fill missing pictures between coded pictures and to keep a frame of the closed caption program feed substantially constant.

23. A non-transitory computer-readable medium storing one or more instructions for a method of closed caption transport, wherein the one or more instructions, when executed by one or more processors, cause the one or more processors to perform:
   receiving closed caption data and a program feed having video content;
   embedding the closed caption data into a standard video syntax; and
   encoding the video content into the standard video syntax as a background including substituting all-black pictures for original coded frames in real time, wherein the closed caption data and the video content are encoded into a closed caption program feed, wherein if the background for captions is configured to appear as gray, then the video content is encoded as (PPPPPP . . . ), and if the background is a color other than gray, the video content is encoded as (IPPPPP . . . IPPPPP . . . IPPPPP), and further wherein I-pictures carry desired background information.

\* \* \* \* \*